United States Patent [19]

Takaoka et al.

[11] Patent Number: 4,532,761
[45] Date of Patent: Aug. 6, 1985

[54] LOAD CONTROL SYSTEM AND METHOD OF COMBINED CYCLE TURBINE PLANTS

[75] Inventors: Hiroshi Takaoka, Urayasu; Toshiki Furukawa; Hiroshi Fukuda, both of Tokyo, all of Japan

[73] Assignee: Tokyo Shibaura Denki Kabushiki Kaisha, Kawasaka, Japan

[21] Appl. No.: 530,785

[22] Filed: Sep. 9, 1983

[30] Foreign Application Priority Data

Sep. 10, 1982 [JP] Japan .................. 57-157594

[51] Int. Cl.³ .................. F02C 6/02; F02C 6/18
[52] U.S. Cl. .................. 60/39.13; 60/39.15; 60/39.182
[58] Field of Search .................. 60/39.03, 39.13, 39.15, 60/39.182

[56] References Cited

U.S. PATENT DOCUMENTS

| 3,762,162 | 10/1973 | Miura et al. | 60/39.182 |
| 3,879,616 | 4/1975 | Baker et al. | 60/39.182 |
| 4,222,229 | 9/1980 | Uram | 60/39.182 |
| 4,430,573 | 2/1984 | Kaya et al. | 60/39.03 |

FOREIGN PATENT DOCUMENTS

| 51-410047 | 12/1976 | Japan . |
| 55-14893 | 4/1980 | Japan . |
| 96307 | 7/1980 | Japan | 60/39.182 |

Primary Examiner—Louis J. Casaregola
Attorney, Agent, or Firm—Schwartz, Jeffery, Schwaab, Mack, Blumenthal & Evans

[57] ABSTRACT

In a combined cycle turbine plant in which a plurality of single shaft type combined cycle systems are combined into a plant, when a set load is to be decreased, the loads of all running shafts are decreased equally until a predetermined load of the unit is reached and thereafter a required number of shafts are stopped.

6 Claims, 8 Drawing Figures

LOAD CONTROL SYSTEM AND METHOD OF COMBINED CYCLE TURBINE PLANTS

BACKGROUND OF THE INVENTION

Exhaust heat recovery type combined cycle turbine plants have been proposed. These include a multi-shaft type combined cycle turbine plant including a plurality of gas turbines and a single steam turbine, as well as a single shaft type combined cycle in which one gas turbine and one steam turbine are coupled to the opposite ends of the shaft of a generator.

According to a conventional system of load control of the single shaft type combined cycle turbine plant, the generator output is controlled by adjusting the fuel flow quantity supplied to the gas turbine.

FIG. 1 of the accompanying drawing is a block diagram showing a conventional load control system of a single shaft type combined cycle plant comprising a compressor 1, a gas turbine 2, an electric generator 3 and a steam turbine 4, all mounted on the same shaft. Air compressed by compressor 1 is supplied to a burner 5 for burning fuel supplied thereto through a fuel adjusting valve 6, and combustion gas is supplied to the gas turbine 2. The combustion gas discharged from the gas turbine 2 is supplied to an exhaust heat recovering boiler 7 to generate steam which is supplied to steam turbine 4 via a steam adjusting valve 8. The steam discharged from the turbine 4 is condensed by a condenser 9, whereby the generator 3 is driven by gas turbine 2 and steam turbine 4.

The number of revolutions of gas turbine 2, etc. is detected by a rotation number (or speed) detector 10 and its output signal is compared with a speed set signal from a speed setter 11 by a comparator 12. The output of comparator 12 is proportionally integrated by an operational amplifier 13 and then applied to a fuel adjusting valve 6 via a servo-amplifier 14 to adjust the opening of the fuel adjusting valve 6. As a consequence, the quantity of fuel supplied to burner 5 of the gas turbine is adjusted for controlling the output of the gas turbine. Since the enthalpy of the steam generated by the exhaust heat recovering boiler 7 is determined by the enthalpy of the exhaust gas from gas turbine 2, the output of the steam turbine 4 is mainly determined by maintaining the steam adjusting valve 8 at a fully opened state or at a partial opening. Thus, the output of the generator 3 supplied to an electric power system is determined by the product of the sum of the outputs of the gas turbine and the steam turbine and the efficiency of the generator.

Thus, the operator observes the generator output detected by a load detector 15 and displayed on an indicator 16 and manually operates the speed setter 11 to control the load.

A load setter 17 and a subtractor 18 may be added for the purpose of automatically effecting the operations of the operator. In this case, a load set signal output by the load setter 17 and a load signal output by load detector 15 are compared in each other with subtractor 18, the output thereof varying the set value of speed setter 11 so as to bring the difference to zero, that is to make the load (generator output) equal to the set value of the load.

Among the methods of load control wherein a plurality of single shaft type combined cycle systems are assembled into one unit or plant, may be mentioned a method (mode A) in which the loads of all shafts are uniformly varied during operation, and another method (mode B) in which the plant load is varied by starting and stopping individual shafts.

Such single shaft type combined cycle systems have a load variation rate characteristic similar to that of a conventional steam electric power generating plant so that there is a disadvantage that in mode B, while running with more than two shafts, the load variation rate as a single unit is smaller than that of mode A.

For example, in a plant having a capacity of 500 MW and comprising five single shaft type combined cycle systems each having a capacity of 100 MW, where the load variation rate is 5%/minute above 50% load and 3%/minute below 5% load, the load variation rates under various running conditions are shown in the following table.

| | Mode A Uniform load variation in running shafts | | Mode B Plant load variation caused by start and stop of shafts | | | |
|---|---|---|---|---|---|---|
| | | | Load increase caused by starting one shaft | | Load decrease caused by stopping one shaft | |
| Number of running shafts | Less than 50% load per one shaft | Larger than 50% load per one shaft | Load of started shaft is less than 50% | Load of started shaft is larger than 50% | Load of stopped shaft is larger than 50% | Load of stopped shaft is less than 50% |
| 1 | 0.6 | 1 | 0.6 | 1 | 1 | 0.6 |
| 2 | 1.2 | 2 | 0.6 | 1 | 1 | 0.6 |
| 3 | 1.8 | 3 | 0.6 | 1 | 1 | 0.6 |
| 4 | 2.4 | 4 | 0.6 | 1 | 1 | 0.6 |
| 5 | 3.0 | 5 | 0.6 | 1 | 1 | 0.6 |

As can be noted from this table, in mode A, when five shafts are running under the same load, the plant load variation rates of 3%/min. under a load of less than 50% and 5%/min. under a load greater than 50% can be obtained, whereas in mode B, the plant load variation rate is extremely small.

FIG. 3a shows a load variation when the load is decreased from 100% (500 MW with 5 shafts) to 60% in a 500 MW plant including five combined cycle shafts each having a capacity of 100 MW. In this case, when two shafts are stopped while the other three shafts are maintained at 100% load, the load varies as shown by dotted lines. Thus, the load variation rate of the plant is decreased.

SUMMARY OF THE INVENTION

Accordingly, it is an object of this invention to provide a novel load control system and method of controlling a combined cycle turbine plant made up of a plurality of single shaft type combined cycle systems. The system and method are capable of increasing or decreasing the load of the plant by starting or stopping one or more shafts and improving the load variation rate.

According to one aspect of this invention, there is provided a load control system of a combined cycle turbine plant including a plurality of single shaft type combined cycle systems, comprising a first signal generator generating an output signal when the difference between a load set by a plant load setter and the output of the plant becomes less than a predetermined value; a second signal generator generating an output when the difference between a product of a set value of load of at least one shaft whose load variation rate varies and a running number of shafts and the output of the plant becomes a predetermined value; means for calculating the number of shafts to be stopped in accordance with a decrease in the load set; means for detecting an interval in which shafts which should continue their running state are to be maintained at a predetermined load; and a start-stop shaft selector which uniformly decreases the load of running shafts until an output signal from either one of the first and second signal generators is applied thereto, and stops shafts of a number calculated by the calculating means calculating the number of shafts to be stopped, the start-stop shaft selector including means for increasing the loads of the shafts which should continue their running in accordance with either one of the signal generated by the first signal generator and a signal generated by the running interval detecting means.

According to another aspect of this invention there is provided a method of controlling load of a combined cycle turbine plant including a plurality of generators each driven by a gas turbine and a steam turbine, the method comprising the steps of gradually decreasing outputs of all generators at the same rate, continuing gradual decrease of the outputs of a predetermined number of generators to zero, and gradually increasing the outputs of remaining generators to a predetermined value from a point intermediate of the gradual decrease of the output of the plant from 100% to zero.

DESCRIPTION OF THE PREFERRED EMBODIMENTS

Figure 1:
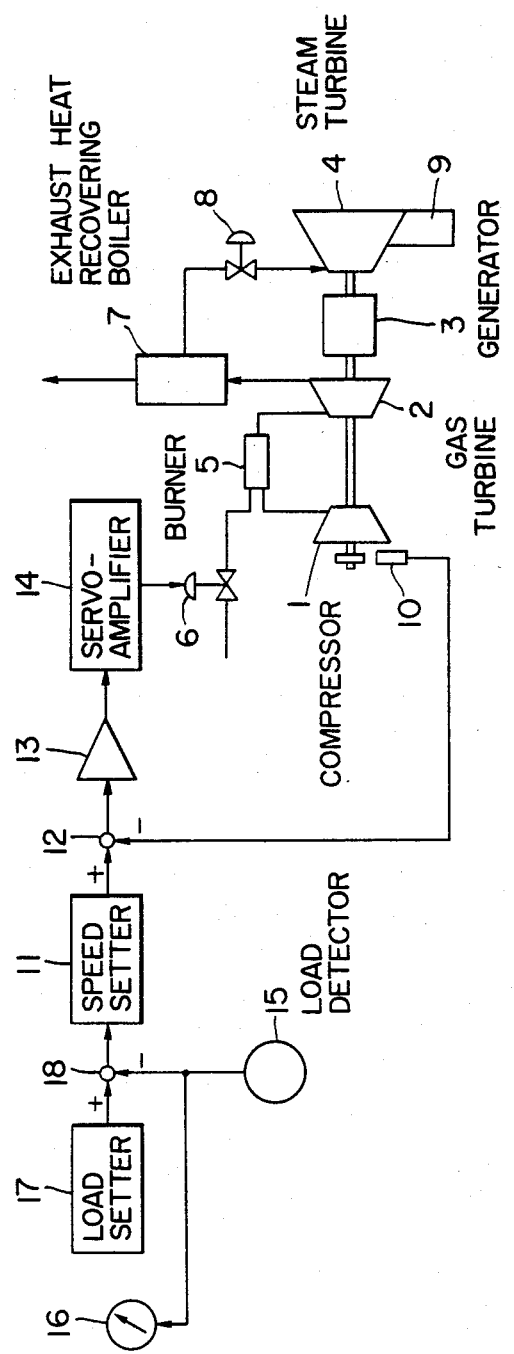
FIG. 1 is a schematic representation of a conventional control system of a single shaft type combined cycle system.
Figure 2:
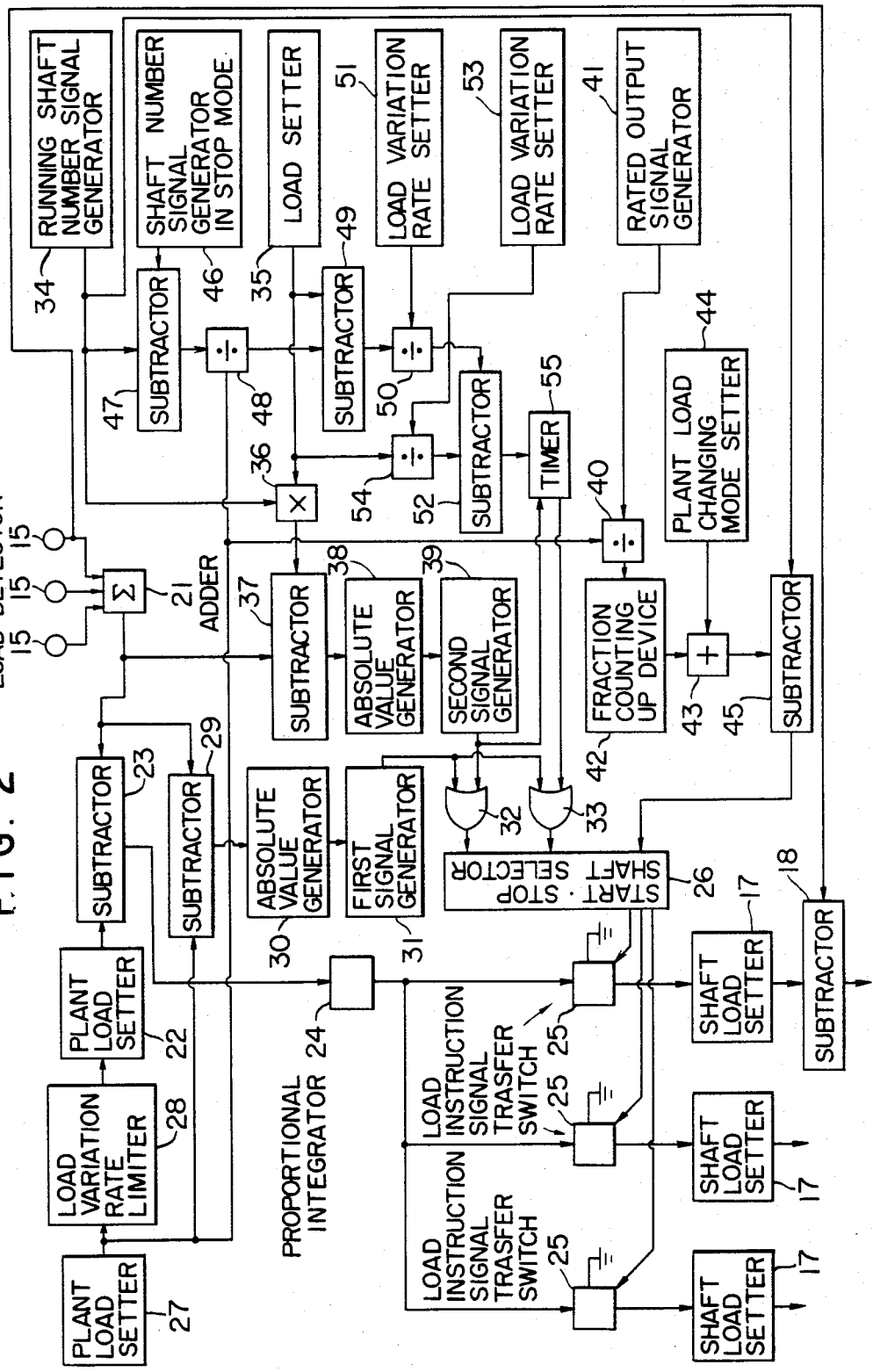
FIG. 2 is a block diagram showing one embodiment of the control system embodying the invention.

Turning now to FIG. 2, there is provided an adder 21 which adds together detection signals from load detectors 15 . . . of respective shafts. A total load signal of the plant outputted by adder 21 is compared with a plant load signal from a plant load setter 22 with a subtractor 23. The output of subtractor 23 is supplied to load setters 17 of respective shafts via a proportional integrator 24 and load instruction signal transfer switches 25 of respective shafts. Each load setter 17 sets a value, based on the signal it receives from a transfer switch 25, as the target load value for a shaft. The output of each load setter 17 is compared with the load signal of each load detector 15 in a subtractor 18. The output of the subtractor 18 is applied to the fuel adjusting valve of a corresponding compound cycle system so as to control the output of the corresponding shaft to become equal to the set value of each load setter 17.

The transfer operation of the load instruction signal transfer switches 25 is controlled by a selector 26 which selects a shaft or shafts to be started or stopped. In mode A, the output of the proportional integrator 24 is supplied to respective load setters 17, whereas when mode B is selected, selector 26 is operated and the load instruction signal transfer switches 25 of given shafts are actuated in accordance with the output signal of selector 26, thus effecting starting or stopping of the given shafts.

The plant load setter 22 is supplied with a stepped load instruction signal from a load setter 27 for producing a plant load set signal, the stepped load instruction signal being converted into a ramp or gradually varying signal.

The signal set by load setter 27 is compared with the total output signal from adder 21 in a subtractor 29 and the difference signal produced thereby is applied to an absolute value generator 30. Thus, the absolute value of the difference signal is applied to a first signal generator 31 which is constructed to generate a signal when the output signal of the absolute value generator 30 is below a predetermined value. The signal generated by the first signal generator 31 is applied to the inputs of first and second OR gate circuits 32 and 33.

A running shaft number signal generator 34 generates a signal corresponding to the number of running shafts. A load setter 35 sets a point at which the shaft load variation rate changes. The output signal of the running shaft number signal generator 34 is multiplied with the output signal of the load setter 35 in a multiplier 36 for calculating a load signal that changes the load variation rate of the plant, the load signal being compared with the output signal from adder 21 in a subtractor 37. The output of subtractor 37 is applied to an absolute value generator 38, thus applying the absolute value of the difference obtained by subtractor 37 to a second signal generator 39. Accordingly, when the output signal outputted by the absolute value generator 38 is below a predetermined value, the second signal generator 39 produces a signal which is applied to the other input of the first OR gate circuit 32. When a signal is inputted to the first OR gate circuit 32 from the first signal generator 31 or the second signal generator 39, the output of OR gate circuit 32 is applied to the selector 26 for stopping a predetermined shaft or shafts.

The signal set by the plant load setter 27 is also applied to a divider 40 where it is divided by a rated output signal generated by a rated output signal generator 41. Generator 41 outputs a signal indicating the rated output per shaft. A fractional output of divider 40 is rounded up to the next integer up by a fraction counting up device 42 to calculate the minimum necessary number of operating shafts corresponding to the set load. The output of the fraction counting up device 42 is added to a signal set by a plant load changing mode setter 44 in an adder 43, and the output thereof is applied to a subtractor 45. The plant load changing mode setter 44 sets the number of idle shafts to be added to the minimum number of shafts. Setter 44 sequentially produces set signals 0, 1, 2 , . . . depending upon whether the number of running shafts is to be reduced to a minimum or increased according to the load at the time of operating in mode B. To the subtractor 45 is also applied a signal from the running shaft number signal generator 34 so that the running shaft number signal is subtracted from the output of the adder 43 to calculate the number of shafts to be stopped as the load varies, and the difference signal is applied to the start-stop shaft selector 26.

Furthermore, the output of running shaft number signal generator 34 is subtracted from the output of a shaft number signal generator 46 in the stop mode in a subtractor 47. The output of the plant load setter 27 is divided by the difference signal from subtractor 47 by a divider 48 to calculate the shaft output after the plant load has changed.

The output signal of divider 48, representing the shaft output after load variation, is applied to a subtractor 49 to be compared with a signal set by the load setter 35. Load setter 35 produces a signal indicating a point at which the shaft load variation rate changes. The resulting difference is divided by a signal set by load variation rate setter 51 in divider 50 when the load is above a predetermined value. This calculation produces a signal indicating the time it takes for a continuously running shaft to reach a desired shaft output based on the plant load variation at the load variation rate determined by the load variation rate setter 51. This time signal is applied to a subtractor 52. The signal set by the load setter 35 setting a point at which the shaft load variation rate changes is divided by a signal set by the load variation rate setter 53 in a divider 54 to calculate a time required for a shaft operating at a load to be stopped at a point at which the shaft load variation rate changes. The time signal thus obtained is applied to subtractor 52 together with the output of divider 50 for calculating the interval in which the running continuing shaft is maintained under a constant load after commencing stopping operation of a shaft to be stopped, and the output of the subtractor 55 is applied to a timer 52 which is started by a signal from the second signal generator 39 for supplying a signal to one input of the second OR gate circuit 33 after an interval calculated by subtractor 52.

In response to the signal from the first signal generator 31 or the signal from the timer 55, the second OR gate circuit 32 applies its output to the start-stop shaft selector 26 to operate a transfer switch 25 corresponding to a shaft which should continue running in accordance with a signal from the proportional integrator 24.

Upon receipt of the signal from the first OR circuit 32, the start-stop shaft selector 26 operates respective transfer switches 25 to prevent the output of the proportional integrator 24 from being applied to respective shaft load setters 17 thereby stopping a predetermined shaft or shafts corresponding to a stop shaft number signal calculated by subtractor 45 in accordance with a predetermined stop sequence. On the other hand, a shaft required to continue running is held at a load at that time until the output of second OR gate circuit 33 is applied to the start-stop shaft selector 26. When the output of the second OR gate circuit 33 is applied to the selector 26, a transfer switch corresponding to the given shaft transmits the signal from the proportional integrator 24 to the shaft load setter 17 of that shaft.

In a plant of a capacity of 500 MW and constituted by 5 one shaft type combined cycle systems each having a capacity of 100 MW, as the load is decreased from 100% (500 MW) to 60% (300 MW), and where running mode A is selected in which the load of all running shafts are varied equally, all transfer switches 25 operate to apply the signal from the proportional integrator 24 to respective shaft load setters 17, whereby the outputs of respective shafts are commonly controlled by the signal from the proportional integrator 24.

In mode B wherein the load of the plant is varied by starting or stopping one or more shafts, when it is desired to decrease the load from 100% (500 MW) to 60% (300 MW), in the same manner as in mode A, the loads of five shafts are equally and simultaneously decreased. As the shaft loads approach 60%, the value of the signal of the absolute value generator 30 approaches 0, and as this signal becomes smaller than a predetermined value, the first signal generator 31 generates a signal which is applied to one input of the first and second OR gate circuits. Consequently, the output of the first OR gate circuit 32 is applied to the start-stop shaft selector 26 to cause it to issue a stop instruction for a predetermined shaft.

At the same time, in response to an output of plant load setter 27 representing 300 MW and an output of one shaft rated output signal generator 41 representing 100 MW, the divider 40 performs a division operation of 300÷100, and the answer 3 is applied to fraction counting up device 43 to be added to a signal set by unit load variation mode setter 44. When all shafts can be stopped, the signal set by the plant load variation mode setter 44 is 0 so that the output of adder 43 would be 3. Thus, the subtractor 45 executes a subtraction operation of 5−3=2 between this output 3 and the output 5 of the running shaft number signal generator 34 to calculate the number of shafts to be stopped, and the result of subtraction 2 is inputted to the start-stop shaft selector 26.

Figure 3A:
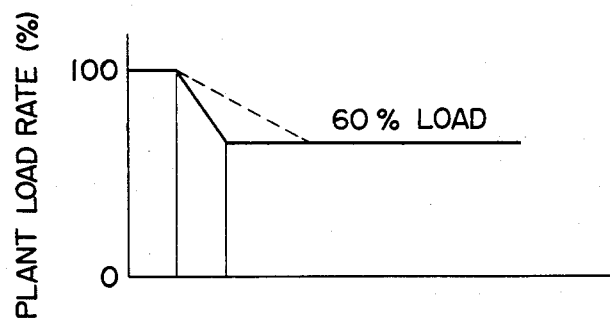
FIGS. 3a, 3b and 3c are graphs respectively showing unit load rate when the load is decreased from 100% to 30%, shaft output variation when the load of the plant is varied by stopping two or three shafts, and the shaft output variation when the loads of 5 shafts are equally varied.
Figure 3B:
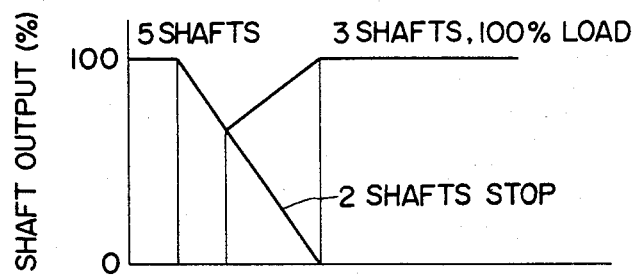
Figure 3C:
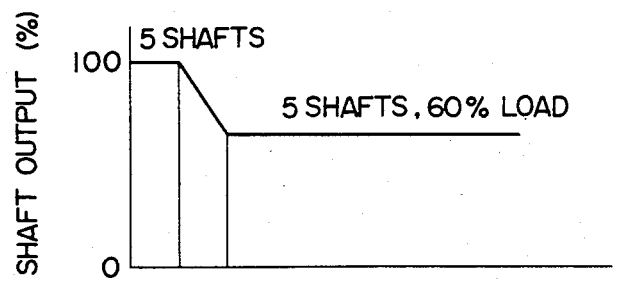

Accordingly, in accordance with the signals from the first OR gate circuit 32 and subtractor 45, the start-stop shaft selector 26 produces a two shaft stop signal so that the connection between transfer switches 25 of predetermined two shafts and the proportional integrator 24 is transferred to stop the two shafts according to a predetermined stop sequence. Since the start-stop shaft selector 26 is also supplied with the output of the second OR gate circuit 33, the transfer switches 25 for the other three shafts which should run continuously do not change their states, and receive the output of the proportional integrator 24, whereby the loads of the three shafts are increased such that the load of the plant would become equal to the set load (see FIG. 3b).

While 5 shafts of the plant are running at 100% load (500 MW), where an instruction for reducing the load to 30% (150 MW), is issued, all 5 shafts begin to evenly decrease their loads simultaneously in the same manner as above described.

Assume now that the signal set by the shaft load setter 35 setting a point at which the load variation rate changes represents 50 MW. The multiplier 36 outputs a signal representing 5×50=250 MW because the number of the running shafts is 5. Accordingly, as a result of equal decrease in the loads of 5 shafts, the output of adder 21 decreases and when output becomes a value representing 250 MW, the output signal from subtractor 37 becomes zero (for simplicity, it is assumed that the value predetermined for the output of the second signal generator 39 is zero), at this time, the second signal generator 39 detects the zero input signal and sends its output signal to the start-stop shaft selector 26 via the first OR gate circuit 32 to stop the shafts to be stopped.

A 150 MW signal set by the plant load setter 27 is divided with a 100 MW signal generated by one shaft rated output signal generator 41 and the quotient 1.5 is counted up to 2 which is applied to subtractor 45 via adder 43 to apply difference 3 between the number 5 of the operating shafts and the number 2 of the shafts to be stopped to the start-stop shaft selector 26 as a signal representing the number of shafts to be stopped, whereby transfer switches 25 of the three shafts are operated so as to stop these shafts according to a predetermined stopping sequence.

At this time, since there is a difference between the output signal of the plant load setter 27 representing 100 MW and the output signal of adder 21 representing 250 MW, the second OR gate circuit 33 does not produce any output so that the remaining two shafts which are not stopped respectively maintain their loads 50 MW.

In divider 54, a load signal 50 MW set by the load setter 35 which sets a point at which the shaft load variation rate changes is divided by a set variation rate signal 3%/min. given from load variation rate setter 53. The quotient 16.7 min. thus obtained represents the time required for a shaft operating under a load of 50 MW to stop. The subtractor 47 calculates the difference 5−3=2 between the number of the running shafts and the number of shafts to be stopped and in divider 48 a signal representing a load 150 MW set by plant load setter 27 is divided by the difference 2 obtained by subtractor 47 to obtain a shaft output 75 MW after variation of the load of the plant. Then, subtractor 49 calculates a difference 75−50=25 MW between the shaft output signal 75 MW and the value 50 MW set by the setter 35 and this difference 25 MW is divided in a divider 50 with a load variation rate 5%/min. set by the load variation rate setter 51 at a load above a predetermined load to calculate a time required for shafts which are run continuously for increasing their loads to 75 MW from 50 MW at a rate of 5%/min. The result 16.7 min. obtained by divider 54 is reduced by 5 min. obtained by divider 50 in subtractor 52 to obtain a time 11.7 min. in which the load of a shaft which should continue its operation at a constant load after commencing stopping operation of a shaft or shafts, and a signal representing this time 11.7 min. is sent to timer 55.

The timer 55 is started by a signal from the second signal generator 39 so as to output an output signal after the time inputted from subtractor 52 has elapsed. Accordingly, the output of timer 55 is sent to the start-stop shaft transfer switch 26 via the second OR gate circuit 33 after 11.7 min. has elapsed after commencing the stopping operation of the shaft to be stopped, thus releasing the shaft which should run continuously from maintaining the constant load. Thereafter, the loads of the two shafts which should continue their operations are increased at a predetermined load change rate of 5%/min. After that, as the signal outputted from the subtractor 23 decreases below a predetermined value, the signal from the proportional integrator 24 is selected to control the loads of the shafts which should continue their running to be equal to the set load 150 MW.

Figure 4A:
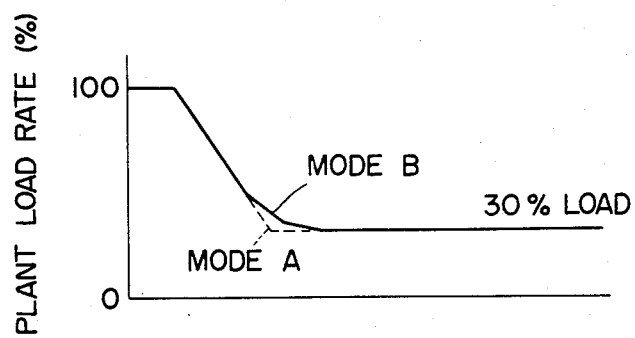
FIGS. 4a, 4b and 4c are graphs respectively corresponding to FIGS. 3a, 3b and 3c when the load is decreased from 100% to 30%.
Figure 4B:
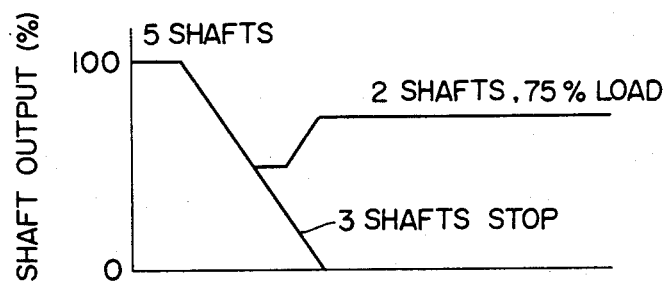
Figure 4C:
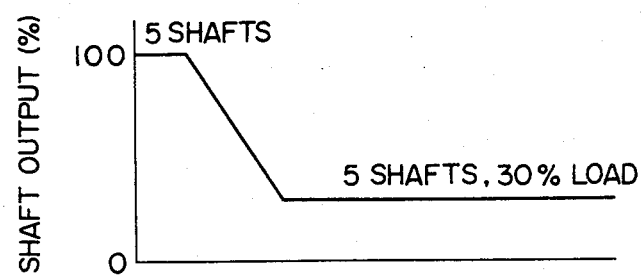

FIG. 4a shows the load variation when the load of the plant is decreased from 100% to 30%, whereas FIG. 4b. shows output variation of five shafts of which 3 shafts are to be stopped while the loads of the other two shafts are decreased from 100% to 75%. As can be noted from FIG. 4b, the loads of the two shafts are gradually increased to 75% after the loads of five shafts have decreased to about 50%. FIG. 4c shows the output variation when the loads of 5 shafts are equally decreased from 100% to 30%.

According to the load control system of this invention for a plant comprising a plurality of single shaft type combined cycle systems, when the set load is to be decreased, the loads of all running shafts are decreased equally until a predetermined load of the plant is reached and thereafter a required number of shafts are stopped. Accordingly, the rate of load variation of the plant can be improved when the load of the plant is to be decreased by stopping one or more shafts. This enables to rapidly control the output of the plant to a desired set value.

We claim:

1. A load control system of a combined cycle turbine plant including a plurality of single shaft type combined cycle systems, said load control system comprising:
   a plant load setter for producing an output setting a desired plant load;
   a load detector for indicating actual plant output;
   a first signal generator for comparing said desired plant load set to said actual plant output and generating an output signal when a difference between said desired plant load set and said actual plant output becomes less than a predetermined value;
   a shaft value means for producing an output indicating a set value of load of at least one shaft whose load variation rate changes;
   a shaft running number indicator for providing an output indicating a number of running shafts;
   a multiplier for producing an output indicative of a product of said shaft value means output and said shaft running number indicator output;
   a subtractor for producing an output indicating a difference between said multiplier means output and said load detector output;
   a second signal generator producing an output signal when said output of said subtractor means becomes less than a predetermined value;
   means for calculating a number of shafts to be stopped in accordance with a decrease in the load set;
   means for detecting an interval in which shafts which continue running are to be maintained at a predetermined load; and
   shaft control means responsive to said first signal generator or said second signal generator and said calculating means for increasing or decreasing the number of running shafts to make the number of stopped shafts equal to that determined by said calculating means, said shaft control means including means for increasing the loads of the shafts which continue running in accordance with either one of a signal generated by said first signal generator or a signal generated by said running interval detecting means.

2. The load control system according to claim 1 wherein said shaft control means comprises a start-stop shaft selector for starting or stopping individual shafts, and a first OR gate connected between said first and second signal generators and said start-stop shaft selector.

3. The load control system according to claim 2 which further comprises a second OR gate circuit connected between said first signal generator and said running interval detecting means, and said start-stop shaft selector.

4. The load control system according to claim 1 wherein said means for increasing the loads comprises:
   a proportional integrator integrating the output of said subtractor;
   a plurality of load instruction signal transfer switches respectively supplied with an output of said proportional amplifier;
   a plurality of shaft load setters respectively connected to receive outputs of corresponding load instruction signal transfer switches; and a plurality of other subtractors each supplied with a signal corresponding to a load of a given shaft and an output of a corresponding shaft load setter for controlling a load of said given shaft.

5. The control system according to claim 1 which further comprises a rated output signal generator for outputting a signal indicating the rated output of one shaft, a divider dividing the load set by said plant load setter with an output of said rated output signal generator, a fraction rounding up device for rounding up a fraction of an output of said divider to the next higher integer, a plant load changing mode setter for outputting a signal indicating a number of shafts, an adder for adding together an output of said fraction counting up device and an output of said plant load changing mode setter, and wherein said calculating means comprises another subtractor comparing an output of said adder with an output of said running shaft number signal generator, and means for applying an output of said another subtractor to said shaft control means.

6. The control system according to claim 5 which further comprises a stopped shaft number signal generator producing an output indicating the number of stopped shafts, a further subtractor comparing the output of said running shaft number signal generator and an output of said stopped shaft number signal generator, a divider dividing a load signal generated by said plant load setter with an output of said further subtractor, a further load setter setting a point at which a shaft load variation rate changes; a still further subtractor comparing an output of said divider with an output of said further load setter, a load variation rate setter, another divider dividing an output of said still further subtractor with an output of said load variation rate setter, and wherein said interval detecting means comprises a time supplied with outputs of said second signal generator and said another divider, and means for supplying an output of said timer to said shaft control means.

* * * * *